United States Patent [19]
Green

[11] Patent Number: 5,746,021
[45] Date of Patent: May 5, 1998

[54] FIRE ANT BAIT STATION

[76] Inventor: William Farley Green, Rte. 5, Box 84, Fort Payne, Ala. 35967

[21] Appl. No.: 669,981

[22] Filed: Jun. 25, 1996

[51] Int. Cl.$^6$ .................................................. A01M 1/20
[52] U.S. Cl. ........................ 43/131; 43/132.1; 111/7.1; 111/7.2
[58] Field of Search .......... 43/124, 131, 132.1; 111/7.1, 7.2, 7.3, 7.4, 95

[56] References Cited

U.S. PATENT DOCUMENTS

| | | | |
|---|---|---|---|
| 612,745 | 10/1898 | Morris | 111/7.2 |
| 1,058,138 | 4/1913 | Ballou | 111/7.1 |
| 1,509,208 | 9/1924 | Hull | 43/132.1 |
| 1,540,660 | 6/1925 | Snow | 43/124 |
| 1,732,279 | 10/1929 | Reimers | 111/7.2 |
| 2,082,712 | 6/1937 | McIvor | 43/131 |
| 2,970,348 | 2/1961 | Imus | 43/131 |
| 4,160,336 | 7/1979 | Query et al. | 43/132 |
| 4,413,440 | 11/1983 | Schultz | 43/124 |
| 4,768,306 | 9/1988 | Hilbun | 43/125 |
| 4,934,288 | 6/1988 | Kusiak | 111/7.1 |
| 5,054,231 | 10/1991 | Witherspoon | 43/124 |
| 5,152,097 | 10/1992 | Rhodes | 43/132 |
| 5,193,721 | 3/1993 | Gryder | 222/341 |
| 5,325,626 | 7/1994 | Jackson | 43/43 |
| 5,340,030 | 8/1994 | Siegrist, Jr. | 239/289 |

OTHER PUBLICATIONS

The Birmingham News, Weekend Report, Elaine Witt, Reporter, Fire Ants: A Burning Issue, Mar. 30, 1996, C1 & C9.

Faith M. Oi et al., Alabama Cooperative Extension Svc., Auburn University, How to Treat for Fine Ants in and Around Homes, Apr. 11, 1996, T-13.

1993 Grolier, Computer Search, pp. 1-4.

Patricia P. Cobb, Extension Entomologist, Al Cooperative Ext. Svcs., Agriculture & Natural Resources, Controlling Imported Fire Ants In Home Lawns, ANR-175.

*Primary Examiner*—Kurt Rowan
*Attorney, Agent, or Firm*—Isaf, Vaughan & Kerr

[57] ABSTRACT

A fire ant bait station having a body portion including a reservoir defined by an enclosed wall and a floor, with an open-ended internally directed collar defined in the floor. A probe is received within the collar in locked, frictional engagement therewith, and is adapted to be inserted into a fire ant mound. The probe includes a tubular shaft with multiple perforations and an internal longitudinal channel formed therein and a pointed tip. The perforations provide access to the reservoir and thus to the bait therewith by the ants.

14 Claims, 2 Drawing Sheets

FIRE ANT BAIT STATION

FIELD OF THE INVENTION

The invention relates in general to an apparatus and method for dispensing pesticides. In particular, the present invention relates to a bait station having a reservoir for containing pesticide bait and a probe having an internal passage connected to the reservoir and adapted to be inserted into a fire ant mound for dispensing the pesticide bait to the fire ants in the mound.

BACKGROUND OF THE INVENTION

One of the most aggressive and bothersome insect pests in the United States today is the fire ant, particularly in the southeastern region of the U.S., including Alabama, Georgia, Florida, Mississippi, Louisiana, Tennessee, Arkansas, the Carolinas, and south central Texas. Fire ants have caused significant problems and destruction throughout large parts of these states and are eventually expected to inhabit most of the United States. Fire ants also have not only caused extensive land destruction but also may cause intensely painful bites or stings that cause severe discomfort including stinging pain, redness and swelling to persons encountering the ants and may even be fatal to small animals, etc. due to the swarming behavior of fire ants that causes multiple stings. In addition, the large mounds built by fire ants interfere with the operation of mowers and other machinery.

Fire ants, like others of their species, are social insects that live and work in groups. The worker ants are sterile, wingless females who maintain the colony. Winged males and non-sterile females leave the colony in the spring and mate in flight. The males die soon after mating and the female falls to the ground, breaks off her wings, and digs a shallow tunnel in the soil. In this tunnel, she deposits eggs which hatch in a week or two. The female, now referred to as the queen, cares for the larvae until they pupate. The sterile, wingless workers who emerge in a week or two assume the duties of maintaining the colony except egg laying. As the colony grows, the worker ants build additional rooms underground and the removed soil is carried above ground where it forms the visible mound. This process is repeated rapidly and efficiently so that the colony grows to an astonishing large size in only a short time. Fire ants also are especially hardy, which has contributed to their rapid spreading across the southeast. Fire ant mounds can be found in almost any type of soil, extending up to twenty feet beneath the surface, with lateral tunnels extending up to seventy-five feet outward and one mound can contain up to 300,000 ants.

There currently are several general methods available for ant control and treatment. One of the oldest involves broadcast spraying, which is the widespread treatment of an area with an insecticide. However, broadcast spraying is not recommended for fire ant control because only foraging ants are killed, leaving the queen to produce more ants. Another method of treatment generally used for fire ants is to apply a poisonous substance directly to a mound. Even the direct application of hot water has been proposed as a means for control of fire ants. However, disturbing the mound in any way to apply poison is also generally non-effective because it may not kill the queen or may allow the queen to escape from the colony to establish new fire ant colonies. Further, as the substance is applied in or around the mound, the chances of getting stung by the ants increases as the mound is disturbed. Also, when poisons are applied in or around the mound, they can be washed away by rain or can be disturbed by animals or children, thus posing a health risk thereto.

Devices have been developed for delivering a pesticide directly into the fire ant mound. For example, U.S. Pat. No. 5,325,626, issued to Jackson, teaches a device for delivering liquid pesticide directly into a fire ant mound. The device has a reservoir for containing the liquid pesticide and a conduit to be inserted into the mound. In use, an amount of liquid pesticide is poured into the reservoir whereupon it will flow through the conduit for delivery to the interior of the mound. One drawback to this device is that it lacks the ability to control or regulate the amount of pesticide delivered to the mound, so that substantially all of the pesticide poured into the reservoir is delivered to the mound. It is very difficult to tell the exact size of the mound from above ground, thus making it difficult to gauge the exact amount of pesticide needed for the mound. Therefore, the operator may deliver more or less pesticide to the mound than is needed to kill the ants in the mound. This can cause oversaturation of the ground with a environmentally unsafe pesticide or can allow some of the ants, including the queen, to escape eradication.

The most recommended method of fire ant eradication involves the use of poisoned baits, applied specifically to a colony and aimed at killing the queen. After the queen dies, no more young queens or workers can be born in the affected colony. Also, worker ants that survive the bait are predators of ants in competing colonies. U.S. Pat. No. 5,152,097, issued to Rhodes, teaches a fire ant trap designed to be staked to the ground in an area infested with fire ants. The trap disclosed contains an amount of fire ant bait which will entice the fire ants into the trap. This trap offers the advantage of operating passively so that it does not deliver unneeded amounts of poison into the ground. A drawback of this trap is that the bait is not directly accessible to the fire ants in the mound.

Thus, it can be seen that a need exists for a method and means for rendering an effective amount of pesticide bait to fire ants in a mound without delivering an excess amount of poison into the ground.

SUMMARY OF THE INVENTION

Briefly described, the present invention comprises a fire ant bait station for delivering poisonous pesticide baits directly into an ant mound. The bait station includes a body portion having an open-ended reservoir, defined by an upstanding side wall and a floor. The reservoir receives and retains a supply of a solid pesticide bait, generally one specifically designed to eradicate fire ants. An open-ended collar or sleeve is formed in the floor and extends into the reservoir of the bait station. A probe is attached to the body portion at the collar, projecting downwardly from the body portion. The probe includes a substantially hollow tubular shaft having a longitudinal passage or channel formed therethrough, and having an open upper end secured to the collar so that the tubular shaft is in communication with the reservoir and a solid tip adapted to be inserted into the mound. The tubular side wall of the probe has a series of perforations formed therethrough, into the longitudinal channel.

When the probe is inserted into an ant mound, the ants will enter the tubular shaft through the perforations and make their way along the channel of the probe to the reservoir. The ants will encounter the bait in the reservoir and carry the bait back to the mound. The other ants of the mound, including the queen, will consume the poisoned bait as food and thus will be eradicated.

The bait station of the present invention can be supplied to the consumer in a assembled condition with poisonous bait loaded in the reservoir, or in an unassembled condition as desired. A removeable cap or cover is provided for enclosing the reservoir to retain the supply of bait therein. In use, the operator simply fills the reservoir with bait, applies the cap and inserts the probe into the mound. The ants move through the probe to the reservoir where they encounter the bait, which they bring back to the colony.

It is, therefore, an object of the present invention to provide a method and a device for delivering poisonous bait into an ant mound.

Another object of the present invention is to provide a device for passively supplying poisonous bait to ants in an ant mound so that the appropriate amount of poisonous bait needed to eradicate the ants in the mound is delivered to the ants without delivering an excess amount of poison into the ground.

Another object of the present invention is to provide a device for delivering poisonous bait to ants in an ant mound that can be reused and can be easily moved from mound to mound.

A further object of the present invention is to provide a fire ant bait station that is non-hazardous to the environment and that can effectively eradicate fire ants in a mound.

Still another object of the present invention is to provide an easy to assemble and use fire ant bait station in which a poisonous bait is securely retained so as to prevent access to and contact therewith by children, animals, etc. while delivering the bait to ants in an ant mound in sufficient quantities to eradicate the ants in the ant mound.

Other objects, features, and advantages of the present invention will become apparent to one with skill in the art upon examination of the drawings and the detailed description.

DETAILED DESCRIPTION OF THE PREFERRED EMBODIMENT

Figure 1:
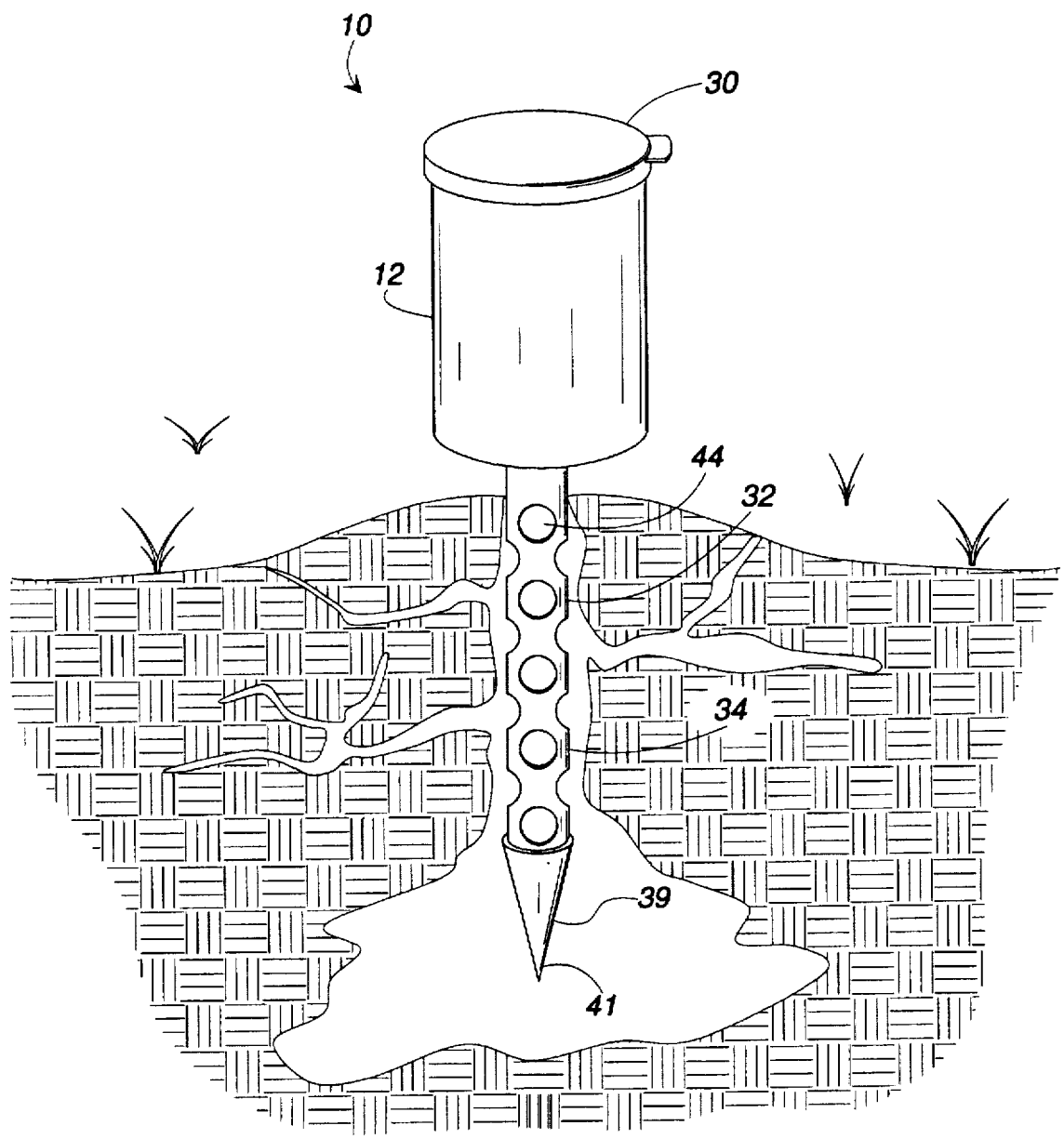
FIG. 1 is a side elevational view of a fire ant bait station of the present invention inserted into a fire ant mound.

Referring now in greater detail to the drawings in which like numerals indicate like parts throughout the several views, the bait station 10 of the present invention generally includes a substantially cylindrical body portion 12 at the upper end of the bait station. The body portion preferably is formed from a plastic material such as a polyolefin or poly(vinyl chloride) (PVC) or a similar lightweight, weather resistant material. The body portion has an upstanding cylindrically shaped side wall 14 having an upper end 16 and a lower end 17, with a substantially horizontally extending floor 18 formed at the lower end 17 of the wall. The wall and floor thus define a substantially cylindrically shaped open-ended reservoir 20 within the body 12 of the bait station 10. The reservoir is adapted to receive and retain a solid poisonous fire ant bait such as fenoxycarb, commonly sold under the trade names LOGIC® and AWARD®; or hydramethylnon, sold under the trade name AMDRO™; or avermectin $B_1$, commonly sold under the trade name FIRE ANT ENDER™. It will be understood by those skilled in the art that other types of pesticides for killing other types of in-ground insects or pests, such as other types of ants, termites, etc., also can be used with the present invention.

Figures 2, 3:
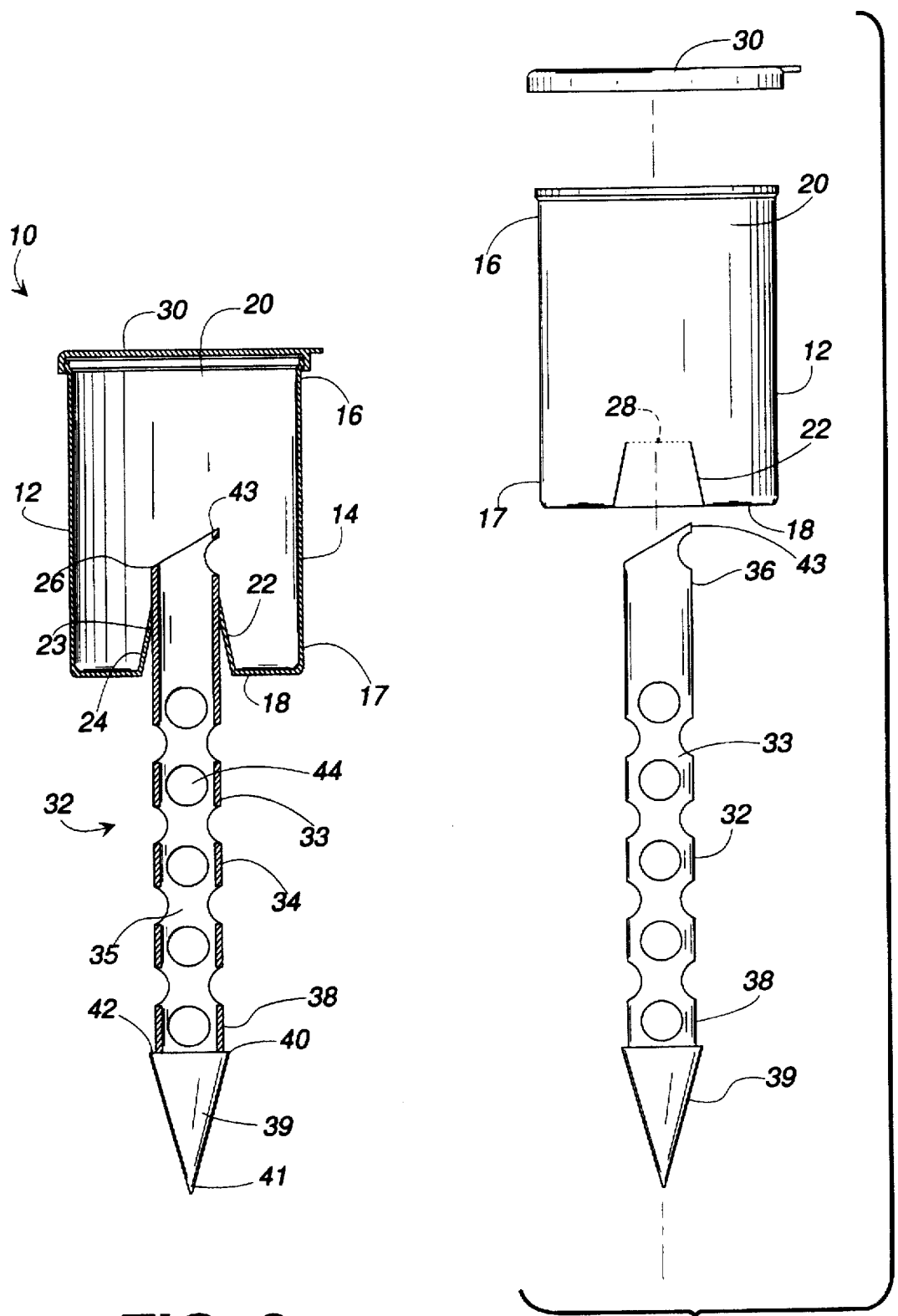
FIG. 2 is a cross sectional side view of a fire ant bait station of the present invention.
FIG. 3 is an exploded side elevational view of the fire ant bait station of the present invention.

As FIG. 2 illustrates, a frustoconically shaped, inwardly tapering collar or sleeve 22 is formed within the floor 18 of the body portion 12, extending upwardly into the reservoir 20 of the body portion. The collar 22 generally is formed as a part of the floor 18, or can be formed as a separate piece if desired. The collar 22 includes a wide diameter open lower end 24 and a narrowed diameter open upper end 26 that is positioned within the reservoir 20. Typically, a diaphragm 28 (shown in dashed lines in FIG. 3) is supplied over the narrow upper end 26 of the collar 22 with unassembled, prefilled bait stations. The diaphragm generally is formed from a thin sheet or film of a plastic material that can be readily punctured, but which seals the upper end of the collar to prevent bait within the reservoir from leaking out of the body portion of the bait station prior to use. In addition, a circular cap or cover 30 is applied over the opened upper end 16 of the side wall 14 of the body portion 12. The cap generally is formed from the same plastic material as the body portion and fits over and engages the upper end of the side wall in a tight frictional engagement therewith to lock the cap onto the body portion and over the reservoir to prevent rain or dust or such from entering the reservoir and to deter access thereto by animals and small children.

As shown in FIGS. 2 and 3, a probe 32 attaches to the body portion 12 of the bait station 10, extending downwardly therefrom, and is adapted to be inserted into an ant mound for mounting the bait station therewithin. The probe generally includes a substantially hollow tubular shaft 33 formed from the same plastic or other material as the body portion of the bait station. Shaft 33 has a substantially cylindrical side wall 34 and defining a vertical internal channel or passage 35 that extends longitudinally through the shaft and is in communication with the reservoir of the body portion, an open upper end 36, and a lower end 38. A solid pointed tip 39 is attached to the lower end 38 of the shaft opposite the body portion. The pointed tip facilitates the probe, and thus fire ant bait station itself, being pushed downwardly into the fire ant mound. The pointed solid tip 39 includes a wide diameter upper end 40 attached to the shaft lower end 38 and a narrow diameter end 41. The diameter of the wide diameter upper end 40 is wider than the diameter of the lower end 38 of the shaft 33 so that a flange 42 is formed. As illustrated in FIG. 2, the upper end 36 of the probe 32 is cut at a slant so that a point 43 is formed.

The probe 32 is attached to body portion 12 of the bait station so that the internal channel 35 of the probe is in communication with the reservoir 20. Preferably, the upper end 36 of the probe 32 generally is of a diameter that is slightly greater than the diameter of the opened upper end 26 of the collar 22. As a result, when the bait station is assembled with the probe introduced into the body portion, the upper end of the probe slides into the collar 22, with point 43 of the upper end 36 piercing the diaphragm 28, and upper end 36 is engaged by the upper end 26 of the collar in a tight frictional engagement. The upper end of the probe is thus locked within the collar of the body portion so that the channel 35 of the probe is in communication with the reservoir 20 of the body portion. In addition, the side wall 34 of the shaft adjacent its upper end is received in close proximity with and/or engaged with the side wall 23 of the collar so as to stabilize the body portion with respect to the probe and create a tight seal between the upper ends of the collar and the probe. In this manner, the bait station is assembled with its probe in tight locking engagement with the body portion to ensure that the body portion of the bait station will be maintained in an upright position when the bait station is mounted in an ant mound so that the bait does not spill into the shaft of the probe where it can be washed away or be engaged by animals, etc. other than the fire ants.

As illustrated in FIGS. 2 and 3, a series of perforations 44 are formed in the side wall 34 of the probe 32 at spaced intervals along the length thereof. The perforations provide access to the channel 35 extending through the shaft for the ants within the ant mound. The ants travel upwardly along the length of the channel and thus are able to enter the reservoir 20 of the body portion of the bait station wherein they encounter the solid poisonous bait. Thereafter, the ants can return to the mound with the poisonous bait via the channel and perforations, which thus provide unlimited access to the reservoir of the bait station and thus to the poisonous ant bait therewithin without actively and indescriminantly introducing dangerous chemical poisons into the ground.

In use of the bait station of the present invention, the bait station can be sold in either an assembled or unassembled condition, and can be sold with an amount of a common poisonous bait contained within its reservoir. If the bait station is unassembled, prior to use, the user simply inserts the upper end of the probe 32 into the body portion 12 of the bait station 10 via the collar 22 formed in the floor of the body portion. The probe is urged through the open upper end 26 of the collar 22 a sufficient distance so that the point 43 of the probe pierces the diaphragm 28 covering the upper end of the collar, and such that the upper end of the collar engages against the upper end of the probe so as to hold the body portion and probe together in a tight stable, frictionally locked relationship. With the bait station of the present invention thus assembled, the user thereafter inserts the pointed tip 39 of the probe downwardly into the center of a fire ant mound or similar in-ground nest. The flange 42 of the probe 32 serves to inhibit dirt from the ant mound from entering into the shaft internal passage from perforations 44 as probe 42 is inserted into a fire ant mound.

Over a period of time, the fire ants will enter the bait station through the perforations 44 formed through the side wall of the shaft of the probe 32 and will travel upwardly along the channel of the probe into the reservoir of the body portion, drawn there by the smell of the bait contained within the reservoir. The ants will pickup and carry the bait back to the mound as a supply of food for the mound. The ants within the mound, including the queen, will consume the bait as food and thus will be poisoned so as to ensure the substantial eradication of the ant colony within the mound.

After the colony has been exterminated, the bait station can be retrieved from the dead ant mound and if needed, cleaned, and can be transferred to additional mounds as needed for eradicating additional fire ant colonies. In addition, as needed, the bait stored within the reservoir can be replenished as it is consumed by the various ant colonies simply by removing the cap from the body portion and pouring additional pesticide bait into the reservoir and then replacing the cap to reseal the reservoir with the ant bait contained therewithin. Thus, the bait station of the present invention can be continually refilled and reused for eradicating fire ant mounds or other in-ground pests efficiently and easily. Further, since the present invention performs its function of delivering poisonous bait to an ant mound in a passive fashion with the ants entering the bait station and thereafter carrying the bait back to the mound, the delivery of the poisonous bait to the mound is performed with much greater control as to the amount of bait delivered to the mound. Precise measurements of the size and depth of the mound for estimation of the exact amount of poison bait sufficient to eradicate each different size ant mound are not necessary. In addition, ant mounds can be effectively eradicated without openly exposing the environment to the poisonous baits and thus posing a health hazard to small animals and children and to the surrounding water table.

It thus will become apparent to those skilled in the art that while the present invention has been described above in relation to a preferred embodiment, various modifications, additions and changes can be made thereto without departing from the spirit and scope of the present invention as set forth in the following claims.

What is claimed is:

1. A bait station for dispensing a poisonous bait to an ant mound, comprising:

a body portion defining a reservoir sized and shaped to hold the poisonous bait therein and having an open collar extending into said reservoir; and an elongate probe said probe comprising:
an elongate shaft defined by a side wall;
said side wall having a plurality of perforations defined therein and extending therethrough;
said shaft defining a longitudinally extending internal channel, said shaft having an upper end and a spaced lower end;
wherein the upper end of said shaft is constructed and arranged to be slidably received within said collar said collar being sized and shaped to be biased against said upper end of said shaft to frictionally hold said shaft in position with respect to said body portion at said collar so that said internal channel of said shaft is in communication with said reservoir;

whereby when the lower end of said shaft is inserted into the ant mound, the ants may pass through said perforations and move along said internal channel into said reservoir where the ants will encounter the poisonous bait for carrying the bait back to the ant mound.

2. The bait station of claim 1, wherein said probe is removably attached to said body portion.

3. The bait station of claim 1, wherein said probe further includes a solid pointed tip attached to said lower end of said shaft.

4. The bait station of claim 1, wherein said collar includes a tapering side wall and wherein said upper end of said shaft fits into and frictionally engages said collar tapering side wall.

5. The bait station of claim 1, wherein said reservoir has an open end, and further including a cap adapted to engage and fit over said open end of said reservoir.

6. The bait station of claim 3, wherein said solid tip has a larger cross sectional area than said shaft lower end so that a flange is created at the point of attachment of said tip and said shaft.

7. A bait station for dispensing a poisonous bait to the ants found within an ant mound, said bait station comprising:

a body portion defining a reservoir adapted to receive and maintain the poisonous bait therein and having an open-ended collar extending into said reservoir; and an elongate probe constructed and arranged to be slidably received within said collar in frictional locking engagement therewith to removably attach said probe to said body portion, a first end of said probe projecting at least partially into said reservoir at said collar, and a spaced second end of said probe being adapted to be inserted into the fire ant mound, said probe comprising an elongate tubular shaft having a side wall defining an internal channel through which said probe is placed in communication with said reservoir said side wall having a series of perforations defined therein;

whereby the ants of the ant mound may enter the probe through the perforations and move along the channel into the reservoir to pick-up the poisonous bait from the reservoir and return with the bait to the ant mound.

8. The fire ant bait station of claim 7, wherein said tubular shaft includes a pointed lower end adapted to be inserted into the ant mound.

9. The fire ant bait station of claim 7 further including a lid adapted to engage and fit over an upper end of said body portion to enclose said reservoir.

10. The bait station of claim 1, further comprising a diaphragm sealed across said collar for sealing the poisonous bait within said reservoir.

11. The bait station of claim 10, wherein an upper end of said probe is sized and shaped to allow said probe to easily puncture said diaphragm as the upper end of said probe and the upper end of said shaft, respectively, are moved through said collar and into the reservoir for placing said channel in communication with said reservoir.

12. The bait station of claim 7, further comprising a diaphragm sealed across said collar for sealing the poisonous bait within said reservoir.

13. The bait station of claim 12, wherein the first end of said probe is pointed so that as the first end of said probe is passed through said collar, the first end of the probe punctures said diaphragm for allowing said channel to communicate with the poisonous bait held within said reservoir.

14. A bait station for dispensing a poisonous bait to an ant mound, said bait station comprising:

a body portion, said body portion defining an internal reservoir sized and shaped to hold the bait therein;

an open collar formed as a part of said body portion and extending inwardly of said reservoir;

an elongate probe, said probe having a first end and a spaced second end, said probe including:
a shaft having a continuous side wall;
said side wall defining a longitudinally extending internal hollow channel within said shaft extending from the first end toward the second end of said probe;
said side wall having a plurality of perforations defined therein and extending therethrough into said shaft; and a diaphragm sealed across said open collar for sealing and storing the poisonous bait within said reservoir;

wherein the first end of said probe is slidably and removably passed through said collar to at least partially extend the first end of the probe into said reservoir, the first end of said probe being sized and shaped to puncture said diaphragm to place said channel in communication with said reservoir;

the second end of said probe being sized and shaped to be inserted into the ant mound;

whereby ants may enter the shaft through the perforations in the side wall and pass through the shaft into the reservoir to retrieve the bait therefrom.

\* \* \* \* \*